US008923573B2

(12) United States Patent
Shinzaki

(10) Patent No.: US 8,923,573 B2
(45) Date of Patent: Dec. 30, 2014

(54) VEIN IMAGE CAPTURE APPARATUS

(71) Applicant: Fujitsu Limited, Kawasaki (JP)

(72) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/742,878

(22) Filed: Jan. 16, 2013

(65) Prior Publication Data

US 2013/0136317 A1 May 30, 2013

Related U.S. Application Data

(63) Continuation of application No. PCT/JP2010/062355, filed on Jul. 22, 2010.

(51) Int. Cl.
G06K 9/00 (2006.01)
G06F 21/32 (2013.01)
G06F 21/83 (2013.01)
G06K 9/20 (2006.01)
H04L 29/06 (2006.01)

(52) U.S. Cl.
CPC ............ G06K 9/00885 (2013.01); G06F 21/32 (2013.01); G06F 21/83 (2013.01); G06K 9/00 (2013.01); G06K 9/00906 (2013.01); G06K 9/2018 (2013.01); H04L 63/0861 (2013.01)
USPC ........................................................ 382/115

(58) Field of Classification Search
None
See application file for complete search history.

(56) References Cited

U.S. PATENT DOCUMENTS

| 6,850,631 | B1 * | 2/2005 | Oda et al. ....................... 382/117 |
| 8,270,729 | B2 * | 9/2012 | Saijo et al. .................... 382/218 |
| 2006/0080547 | A1 * | 4/2006 | Higashiura et al. ........... 713/186 |
| 2006/0192868 | A1 * | 8/2006 | Wakamori ..................... 348/294 |
| 2006/0204132 | A1 * | 9/2006 | Fukuda et al. ................. 382/282 |
| 2008/0063244 | A1 * | 3/2008 | Tanaka et al. ................. 382/115 |
| 2008/0069411 | A1 * | 3/2008 | Friedman et al. ............. 382/118 |
| 2009/0281432 | A1 * | 11/2009 | Higuchi et al. ............... 600/476 |
| 2010/0177182 | A1 * | 7/2010 | Kagenow et al. ............... 348/77 |
| 2011/0211056 | A1 * | 9/2011 | Publicover et al. ............. 348/78 |

(Continued)

FOREIGN PATENT DOCUMENTS

| JP | 2007-30569 | 2/2007 |
| JP | 2007-249615 | 9/2007 |

(Continued)

OTHER PUBLICATIONS

Lingyu, W. and Leedham, G. "Near- and Far-Infrared Imaging for Vein Pattern Biometrics." 2006 Proceedings of the IEEE International Conference on Video and Signal Based Surveillance.*

(Continued)

Primary Examiner — Vu Le
Assistant Examiner — Samah Beg
(74) Attorney, Agent, or Firm — Staas & Halsey LLP

(57) ABSTRACT

A vein image capture device includes an illumination device, an image capture device, and a support device. The image capture device captures an image of a vein pattern of a body part by receiving light reflected by the body part. The support device is arranged between the body part and the image capture device to transmit at least apart of the reflected light and support the illumination device at the body part side. The image capture device is separated from the support device by the distance at which the image capture device may receive the reflected light.

8 Claims, 10 Drawing Sheets

(56) References Cited

U.S. PATENT DOCUMENTS

| | | |
|---|---|---|
| 2011/0222740 A1* | 9/2011 | Kitane .......................... 382/115 |
| 2012/0195477 A1* | 8/2012 | Kiyomizu et al. ............ 382/124 |
| 2013/0200995 A1* | 8/2013 | Muramatsu et al. ......... 340/5.51 |

FOREIGN PATENT DOCUMENTS

| | | |
|---|---|---|
| JP | 2008-71137 | 3/2008 |
| JP | 2008-212311 | 9/2008 |
| JP | 2008212311 A * | 9/2008 |
| JP | 2009-276860 | 11/2009 |
| JP | 2010-129030 | 6/2010 |

OTHER PUBLICATIONS

International Search Report of PCT/JP2010/062355 mailed Aug. 17, 2010.

Office Action mailed Dec. 10, 2013 in corresponding Japanese Application No. 2012-525280.

Office Action mailed Jul. 15, 2014 in corresponding Japanese Patent Application No. 2012-525280.

* cited by examiner

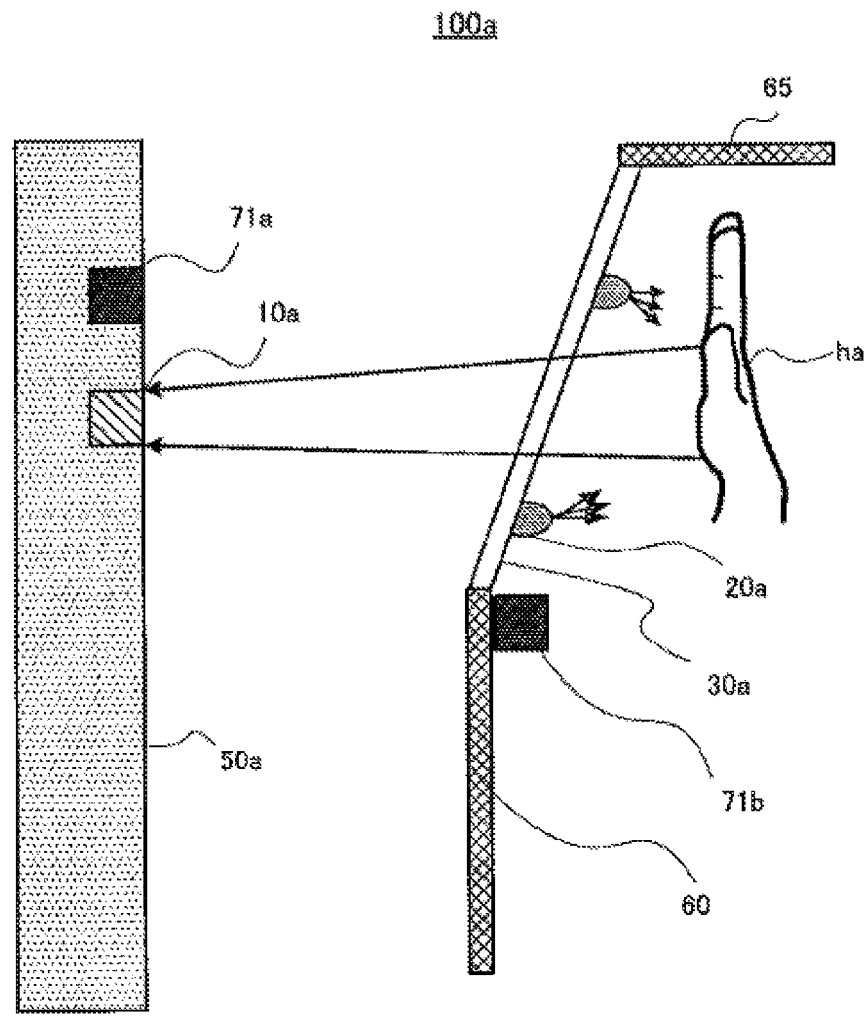
F I G. 3A

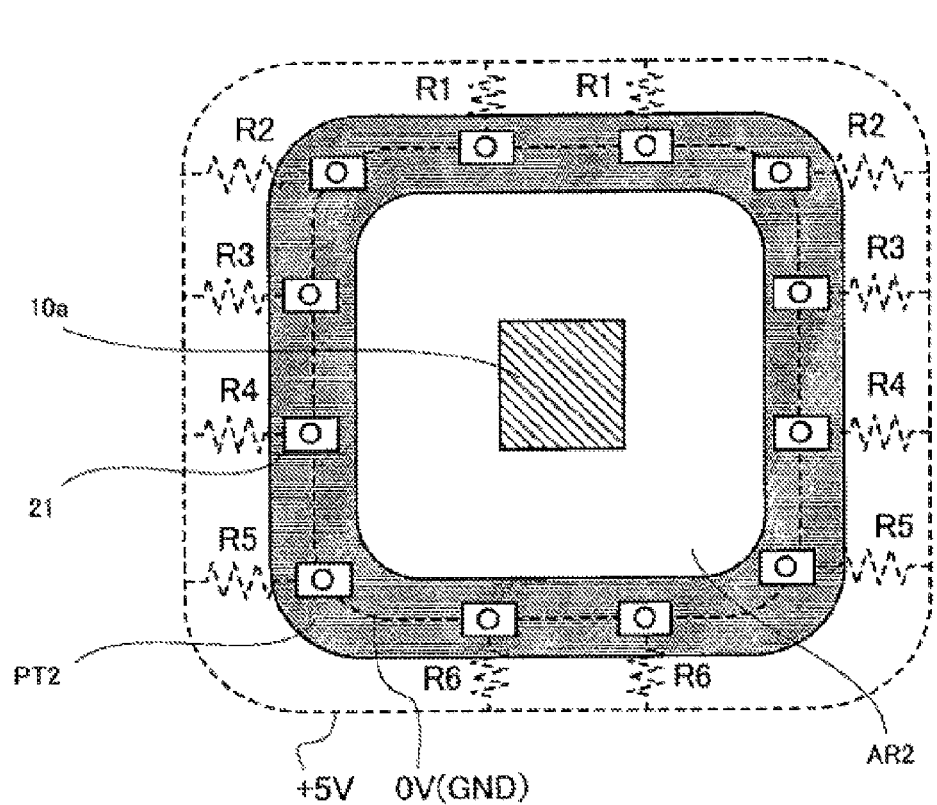
F I G. 4

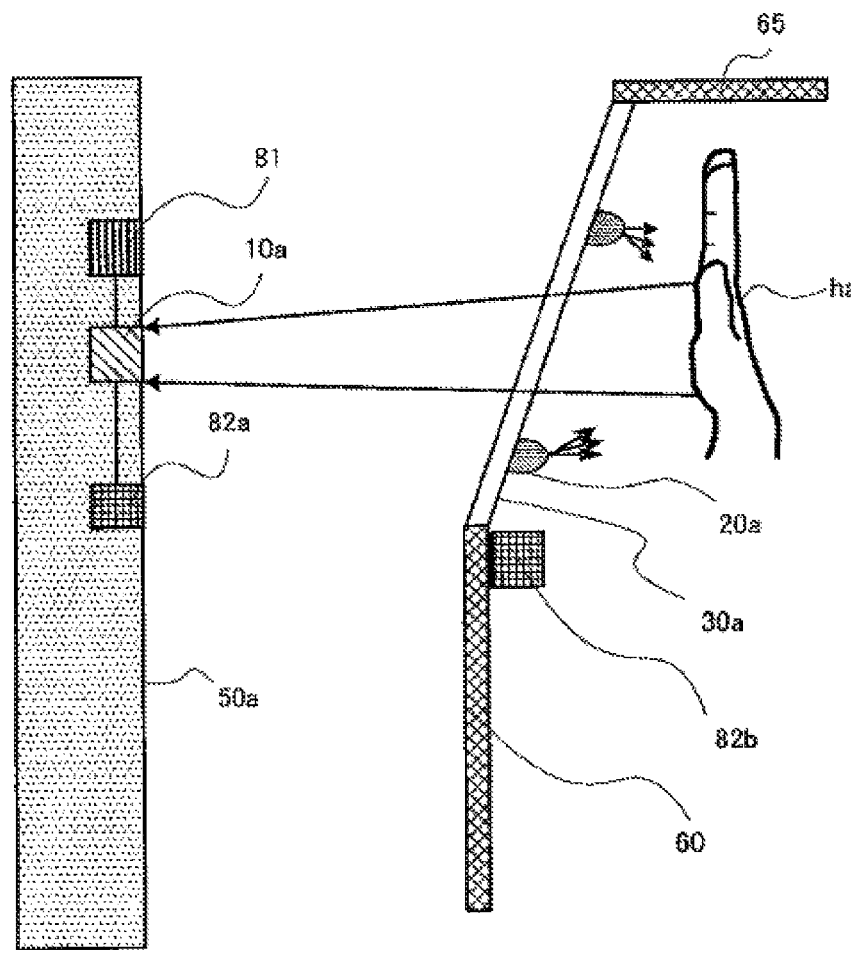
F I G. 5 A

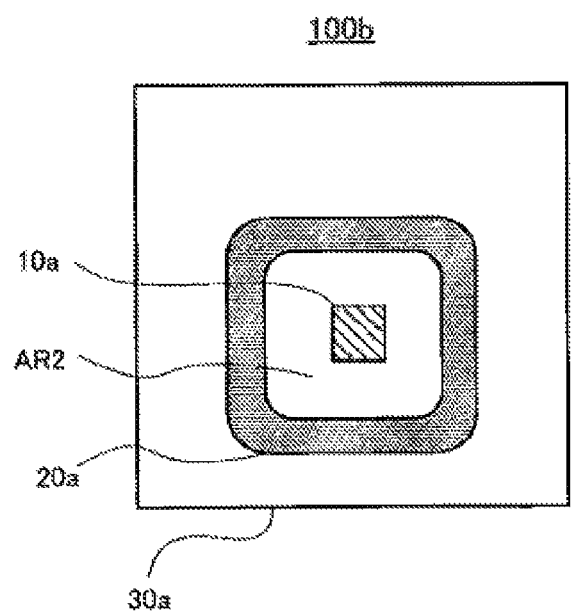
F I G. 5 B

US 8,923,573 B2

VEIN IMAGE CAPTURE APPARATUS

CROSS-REFERENCE TO RELATED APPLICATIONS

This application is a continuation of International application No. PCT/JP2010/062355, filed on Jul. 22, 2010, the entire contents of which are incorporated herein by reference.

FIELD

The present invention is related to a vein image capture device for shooting a vein pattern image.

BACKGROUND

With the recent development of biometric technology, provided are various types of devices for personal identification by recognizing the physical characteristics of a body part of a person by capturing, for example, the fingerprints of limbs, the retina of an eye, the face, the blood vessels, etc. of a person.

Especially, since the blood vessels of a palm or a finger, and palm prints provide a relatively large amount of personal characteristic data, they are appropriate for personal identification with reliability. Furthermore, the pattern of blood vessels (vein) is not changed throughout one's lifetime after it is determined in the womb, that is, unique throughout the world, which is appropriate for personal identification.

As a concrete method of capturing a vein image, an illumination device emits near-infrared light to the palm, the near-infrared light reflected by the palm is captured by a camera provided with an image sensor (patent documents 1 and 2). Since the hemoglobin in the red blood cells absorbs the near-infrared light, the quantity of the reflected near-infrared light from the vein parts decreases when the near-infrared light is emitted to the palm. Therefore, the camera may shoot the position of the vein on the palm based on the strength level of the near-infrared light.

There may be restrictions on the installation of a vein image capture device designed as a unitary construction of an illumination device and a camera. For example, when the vein image capture device is to be installed on the door of an apartment, the vein image capture device requests the thickness for the device to be embedded in the door.

Patent Document 1: Japanese Laid-open Patent Publication No. 2007-249615
Patent Document 2: Japanese Laid-open Patent Publication No. 2007-30569

SUMMARY

According to an aspect of the vein image capture device of the present invention, the vein image capture device includes: an illumination device which illuminates a body part of a living body; an image capture device which captures a vein pattern of the body part by receiving light reflected by the body part; and a support device which is provided between the body part and the image capture device, passes the reflected light, and supports the illumination device at the body part side. The image capture device is separated from the support device by a distance at which the image capture device receives the reflected light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B are schematic diagrams of examples of the configuration of the vein image capture device according to the second embodiment;

FIG. 4 is a schematic diagram of an example of the configuration of an illumination device according to the second embodiment;

FIGS. 5A and 5B are schematic diagrams of variation examples of the configuration of the vein image capture device according to the second embodiment.

DESCRIPTION OF EMBODIMENTS

An example of the embodiments is described below with reference to the attached drawings.

[First Embodiment]

Figure 1A:
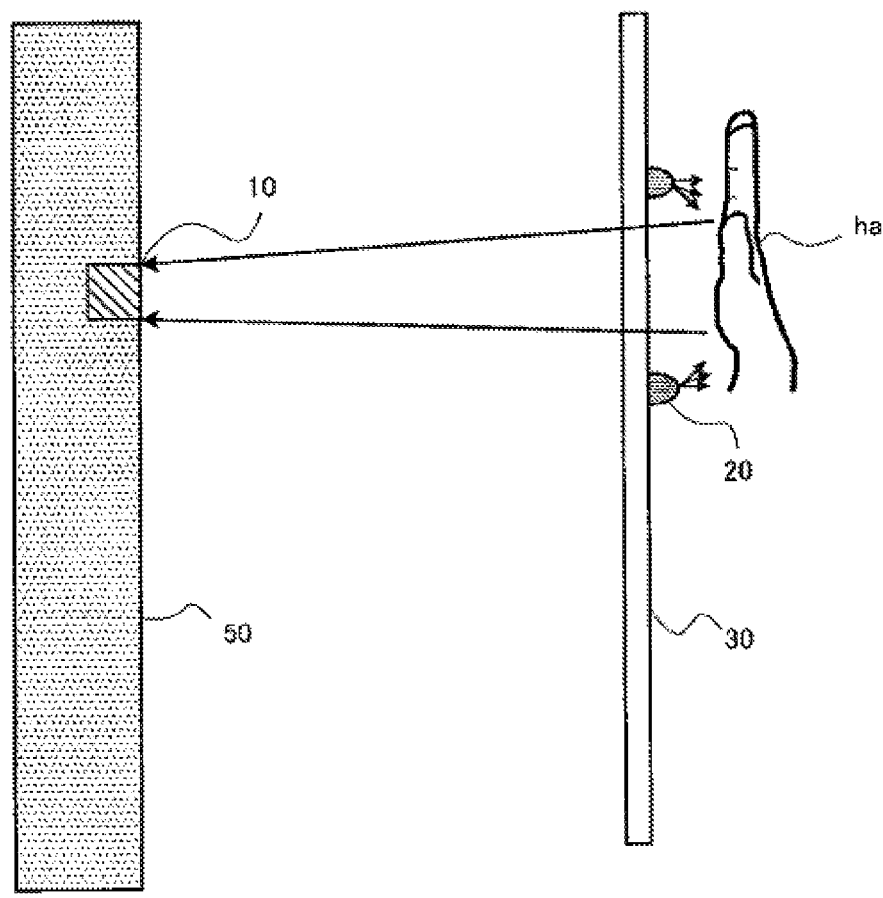
FIGS. 1A and 1B are schematic diagrams of examples of the configuration of the vein image capture device according to the first embodiment.
Figure 1B:
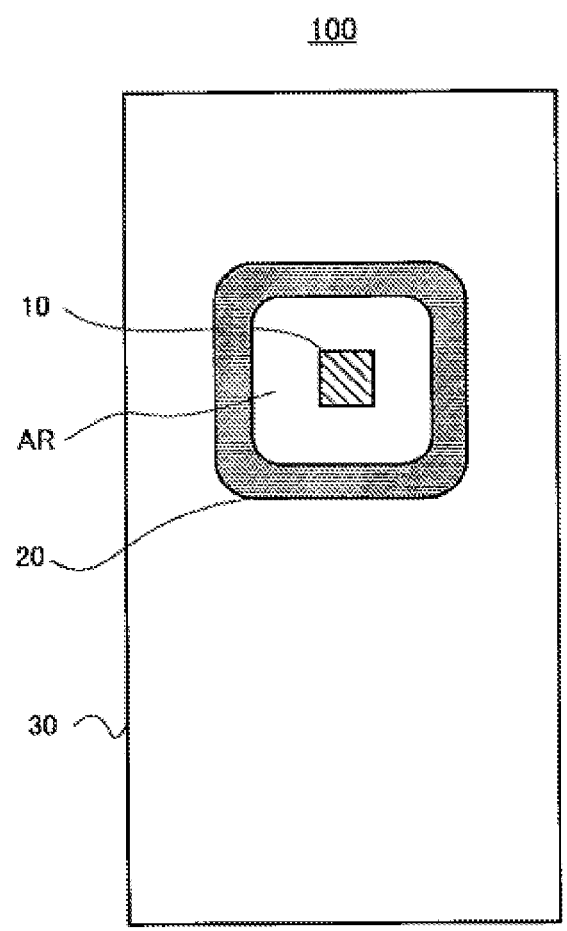

First, an example of the configuration of a vein image capture device 100 is described with reference to FIGS. 1A and 1B. FIG. 1A is a side view of the vein image capture device 100, and FIG. 1B is a front view of the vein image capture device 100. In FIG. 1A, the arrow in solid line indicates the direction of the travel of the light.

The vein image capture device 100 is provided at, for example, the entrance of a building, and captures a vein pattern of the palm of a person to be checked for authentication such as a visitor etc.

As illustrated in FIG. 1A, the vein image capture device 100 includes an image capture device 10, an illumination device 20, and a support device 30 for supporting the illumination device 20.

The image capture device 10 is, for example, a camera provided with an image sensor, and is attached to a wall surface 50. The illumination device 20 has a plurality of light sources, and illuminates the palm ha of a person to be checked for authentication by emitting the near-infrared light. The plurality of light sources may be, for example, an LED (light emitting diode) . The support device 30 is, for example, a door, a window, etc., and is provided between the palm ha of a person to be checked for authentication and the image capture device 10. At least a part of the support device 30 is formed by a transparent object such as glass which transmits the reflected light from the palm ha of the person to be checked for authentication. The image capture device 10 captures the vein pattern of the palm ha by receiving the reflected light which has transmitted through the support device 30. To be more detail, the image capture device 10 captures the vein pattern of the palm ha by receiving the diffused light in the illuminated palm ha.

It is preferable that the image capture device 10 is a camera having a narrow-angle lens, The longer the distance between the device and the object to be shot, the narrower the angle of view is. For example, when the vein pattern of a palm of 15 cm is captured, and when the distance between the image capture device 10 and the palm ha is 1.5 m, a camera with a lens having the angle of view of 5.72° is used. When the distance between the image capture device 10 and the palm ha is 3 m, a camera with a lens having the angle of view of 2.86° is used. In addition, when the distance between the image capture device 10 and the palm ha is 5 cm as in the case of an ATM (automated teller machine), a camera with a lens having the angle of view of about 112.62° is used. Thus, the longer the distance from the object to be shot, the narrower the angle of view of the lens becomes for a camera as the image capture device 10, thereby allowing the light reflected by the palm ha to easily enter the image capture device 10.

The illumination device 20 is provided at the palm ha side in the support device 30. The reason is described below. For example, when the illumination device 20 is provided at the image capture device 10 side in the support device 30, the illumination device 20 illuminates the palm through the support device 30. Thus, when the light emitted from the illumination device 20 directly enters support device 30, there is the possibility that the optical noise caused by the reflection of the light in the support device 30 has the influence on the captured image. On the other hand, when the illumination device 20 is provided at the palm ha side in the support device 30, the illumination device 20 illustrates the palm ha without passing through the support device 30. In this case, since the light emitted from the illumination device 20 does not directly enter the support device 30, the reflection of the light in the support device 30 may be suppressed.

For example, if the support device 30 is made of glass, the support device 30 reflects the light at the reflectance of about 10% when the light emitted from the illumination device 20 directly enters the support device 30. In this case, there is the possibility that a whiteout occurs as optical noise on the image of a captured vein pattern. On the other hand, the reflectance of the light when the surface reflected light from the palm ha enters glass is about 5%. Furthermore, the reflectance of the light when the diffused light in the illuminated palm ha enters glass is lower than 5%.

That is, as compared with the case in which the illumination device 20 is provided at the illumination device 20 side in the support device 30, when the illumination device 20 is provided at the palm ha side in the support device 30, the reflection of the light may be suppressed in the support device 30, and the occurrence of the optical noise may be reduced.

In addition, in the vein image capture device 100, the image capture device 10 is separated from the support device 30 by the distance at which the image capture device 10 may receive light reflected from the palm ha of a person to be checked for authentication. That is, in the vein image capture device 100, the image capture device 10 is separated from the illumination device 20. With the arrangement, for example, a door and a window may function as the support device 30 of the illumination device 20. That is, as compared with the vein image capture device in which the illumination device and the image capture device are incorporated as a unitary construction, the vein image capture device 100 according to the first embodiment maybe applied although the thickness of the door or window is thicker.

Described below is the configuration of the illumination device 20. As illustrated in FIG. 1B, the contour pattern of the illumination device 20 is circular.

Figure 2:
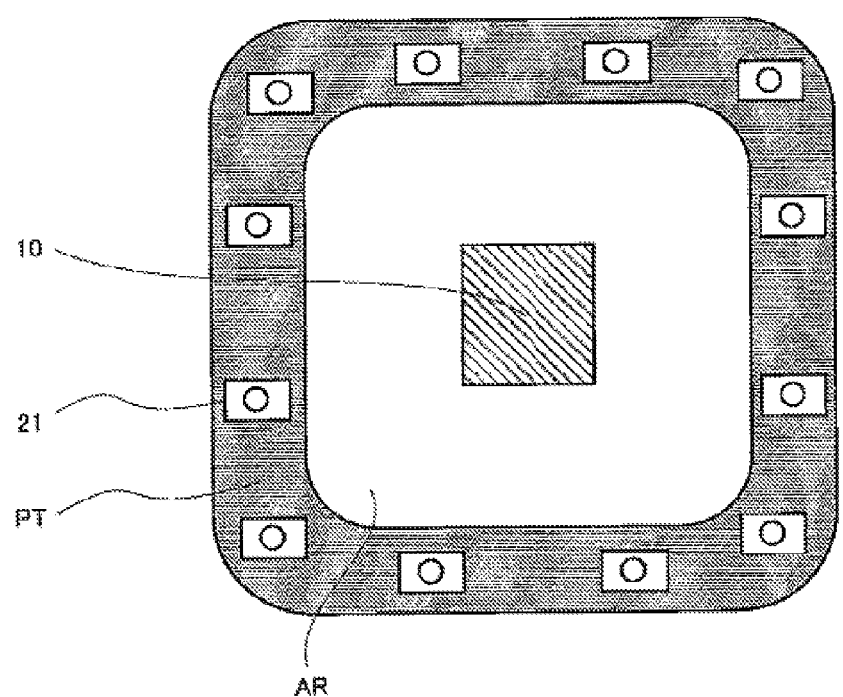
FIG. 2 is a schematic diagram of an example of the configuration of an illumination device according to the first embodiment.

The illumination device 20 is described below with reference to FIG. 2. FIG. 2 is a schematic diagram of the configuration of the illumination device 20, and an enlarged view of FIG. 1B. As illustrated in FIG. 2, the illumination device 20 has the configuration in which, for example, a plurality of LEDs 21 are arranged on the contour pattern PT marked circularly. The illumination device 20 is provided in the support device 30 so that the image capture device 10 is positioned may be positioned in the area AR enclosed in the contour pattern PT. The palm ha is irradiated with the light emitted from the plurality of LEDs 21. The light reflected from the palm ha enters the image capture device 10 through an area AR.

As described above, the vein image capture device 100 according to the first embodiment has the illumination device 20, the image capture device 10, and the support device 30 which supports the illumination device 20. The illumination device 20 illuminates the palm ha of a person to be checked for authentication, and the image capture device 10 captures the vein pattern of the palm ha by receiving the light reflected by the palm ha. At this point, the support device 30 supports the illumination device 20 at the palm ha side. Thus, the occurrence of the optical noise may be suppressed on the captured image of the vein pattern. Also in the vein image capture device 100 according to the first embodiment, the image capture device 10 is separated from the support device 30 by the distance at which the image capture device 10 may receive the light reflected by the palm ha. That is, the image capture device 10 is separated from the illumination device 20. Thus, the support device 30 is only to support the illumination device 20, and the thickness of the support device may be thicker as compared with the case in which the support device 30 supports both image capture device and illumination device, thereby realizing a wider application of the vein image capture device. In addition, by keeping the distance between the support device 30 and the palm ha longer than the distance between the image capture device 10 and the support device 30, avoided is the fluctuation of the magnification of the image of the vein pattern which is caused by different distances between the support device 30 and the palm ha each time the authentication is checked.

It is not always requested that the illumination device 20 is kept turned on. Instead, the vein image capture device 100 may include a control device for synchronizing the illuminating timing for the illumination device 20 with the capturing timing of the image capture device 10. With the configuration, the power consumption of the illumination device 20 may be reduced, and the infrared illumination time for the palm ha may be shortened.

[Second Embodiment]

Figure 3B:
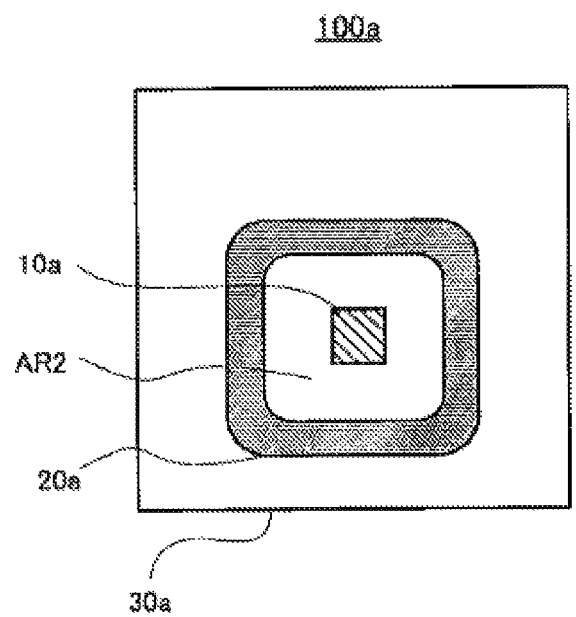

Next, an example of the configuration of a vein image capture device 100a is described with reference to FIGS. 3A and 3B. FIG. 3A is a side view of the vein image capture device 100a, and FIG. 3B is a front view of the vein image capture device 100a. In FIG. 3A, the arrow in solid line indicates the direction of the travel of the light (same in FIG. 5A).

As illustrated in FIG. 3A, the vein image capture device 100a includes an image capture device 10a, an illumination device 20a, and a support device 30a for supporting the illumination device 20a. In the vein image capture device 100a according to the second embodiment, a glass window of a car is used as the support device 30a for supporting the illumination device 20a. In the example illustrated in FIG. 3A, the glass window of a car door 60 is used as the support device 30a. The image capture device 10a is provided for a support of a parking lot, for example. In the example illustrated in FIG. 3A, the image capture device 10a is provided for a support 50a. A driver stops his or her car beside the support 50a. As illustrated in FIG. 3B, the stopping position of the car is set so that the image capture device 10a may be positioned in an area AR2 enclosed by the contour pattern designed circularly in the illumination device 20a. After stopping the car, the driver holds his or her palm ha from inside the car up to the illumination device 20a, thereby inputting the vein pattern to the image capture device 10a.

In the vein image capture device 100a according to the second embodiment, as with the vein image capture device 100 according to the first embodiment, the support device 30a supports the illumination device 20a from inside the car, that is, at the palm ha side. Therefore, the 100a also suppress the occurrence of the optical noise on the image of the captured vein pattern.

In addition, the vein image capture device 100a has a communication device for performing wireless communications between the support 50a and the car door 60. Concretely, as illustrated in FIG. 3A, the support 50a is provided with a radio antenna 71a, and the car door 60 is provided with a radio switch 71b for illumination. The radio switch 71a emits radio waves. When the car approaches the support 50a, the radio switch 71b receives the radio waves from the radio antenna 71a. Upon receipt of the radio waves, the radio switch 71b turns on the switch of the illumination device 20a, thereby turning on the illumination device 20a. The directivity and the intensity of the radio waves are set so that the radio switch 71b may receive the radio waves when the image capture device 10a is positioned in the area AR2 enclosed by the illumination device 20 arranged circularly. With the configuration, the driver is only to operate the car so that the illumination device 20a may be at the position where the illumination device 20a is turned on without confirming whether or not the image capture device 10a is in the area AR2.

It is assumed that the image capture device 10a has a physical or electronic tracking function, and a vein pattern of the palm ha may be captured by tracking the portion where the palm ha is held up by detecting the contour pattern of the illumination device 20a. With the configuration, although the position of the area AR2 enclosed by the illumination device 20 and the position of the image capture device 10a are somewhat shifted from each other due to the shift of the stopping position of the car, the image capture device 10 may capture the contour pattern of the palm ha. In this case, the directivity and intensity of the radio waves from the radio antenna 71a are set so that the radio switch 71b may receive the corresponding radio waves in a range where the image capture device 10a may perform tracking on the palm ha.

Furthermore, the glass window of the car door 60 is inclined to the ground in many cases. Concretely, in the direction toward a ceiling 65 of the car, the glass window is inclined to the inside of the car. To evenly illuminate the palm ha of the driver, the brightness of the illumination device 20a is designed to decrease in the direction toward the ceiling 65 of the car. In other words, in the illumination device 20a, the closer to the palm ha, the lower the brightness becomes, which is described below concretely with reference to FIG. 4.

FIG. 4 is a schematic diagram, and an enlarged view of FIG. 3B. In FIG. 4, the broken line indicates the wiring of the LED 21.

As illustrated in FIG. 4, as with the illumination device 20 according to the first embodiment, the illumination device 20a has the configuration in which a plurality of LEDs 21 are arranged on the circularly marked contour pattern PT2. The palm ha is irradiated with the light emitted from the plurality of LEDs 21.

As illustrated in FIG. 4, the voltage of +5V is applied in parallel to each of the plurality of LEDs 21. Then, a resistor is connected to each of the plurality of LEDs 21. Concretely, sequentially from the ceiling of the car, resistors R1, R2, R3, R4, R5, and R6 are connected in series to each of the LED 21. Assume that the R1 through R6 indicate the values of resistance. The values of resistance are set as R1>R2>R3>R4>F5>R6. With the settings, the closer to the ceiling 65 of the car, the lower the current and the brightness become. That is, the closer to the palm ha, the lower current passes through the LED 21, and the lower the brightness becomes. On the other hand, the farther the LED 21 is, the higher current passes, thereby increasing the brightness. Thus, the palm ha of the driver is evenly irradiated with light.

The vein image capture device 100a illustrated in FIG. 4 is provided with a communication device for performing wireless communications between the support 50a and the car door 60. Instead, a communication device for performing communications using signal light between the support 50a and the car door 60 may be provided. FIGS. 5A and 5B illustrate an example of a vein image capture device 100b used when a communication device for performing communications using signal light is provided.

The vein image capture device 100b illustrated in FIGS. 5A and 5B has the support 50a provided with a pyroelectric sensor 81 and a signal light transmission unit 82a, and the car door 60 is provided with a signal light reception unit 82b. The pyroelectric sensor 81 is connected to the signal light transmission unit 82a. The pyroelectric sensor 81 detects a mobile object which emits infrared light. Upon detection of the object, the pyroelectric sensor 81 transmits a detection signal to the signal light transmission unit 82a. Therefore, the pyroelectric sensor 81 functions as a detection device. Upon detection of a car approaching the support 50a, the pyroelectric sensor 81 transmits a detection signal to the signal light transmission unit 82a. Upon receipt of the detection signal, the signal light transmission unit 82a transmits pulse light to the outside of the support 50a. At the car door 60, upon receipt of the pulse light transmitted from the signal light transmission unit 82a, the signal light reception unit 82b turns on the illumination device 20a.

The direction of the transmission of the pulse light from the signal light transmission unit 82a is set so that, for example, the signal light reception unit 82b may receive the pulse light when the image capture device 10 is located in the area AR2 enclosed by the circularly arranged illumination devices 20. Otherwise, when the image capture device 10 has a tracking function, the direction of the transmission of the pulse light from the signal light transmission unit 82a is set so that the signal light reception unit 82b may receive the pulse light in the range in which the image capture device 10a may perform tracking on the palm ha. With the configuration, the driver is only to operate the car so that the illumination device 20a is turned on without confirming whether or not the image capture device 10a is located in the area AR2.

As described above, the vein image capture device 100a according to the second embodiment is provided with a glass window of a car as the support device 30a for supporting the illumination device 20a, and the image capture device 10a is attached to, for example, a support of a parking lot etc. As with the first embodiment, the support device 30a supports the illumination device 20a at the inside of the car, that is, on the palm ha side. With the configuration, the occurrence of optical noise may be suppressed on the image of a captured vein pattern.

[Variation Example]

Described next is a variation example of each embodiment.

In the vein image capture device according to each of the embodiments above, a light source for emitting near-infrared light is used as a light source of an illumination device (LED in this example), but the present invention is not limited to this application. It is obvious that a light source of am illumination device is not limited to a device which emits near-infrared light, but any device which emits light having a plurality of wavelengths may be used. Furthermore, in an illumination device having a light source which emits light of a plurality of wavelengths, the illustration timing for emitting light of each wavelength is shifted, and each illustration timing may be synchronized with the capture timing of an image capture device. For example, an illumination device may be provided with a light source for emitting near-infrared light and a light source for emitting visible light, the illustration timing of emitting the near-infrared light is synchronized with the capture timing of the image capture device, and the illustration timing of emitting the visible light is synchronized with the capture timing of the image capture device. With the configuration, the vein pattern may be captured with the timing of emitting the near-infrared light, and the palm print may be captured with the timing of emitting the visible light. Thus, in addition to the vein pattern of the palm, the palm print may be used in authentication, thereby improving the authentication accuracy.

Figure 6A:
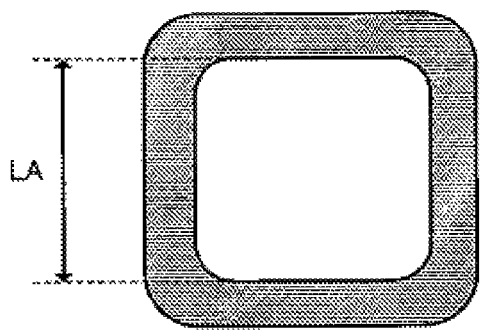
FIGS. 6A and 6B illustrate the shape and size of the contour pattern of the illumination device.
Figure 6B:
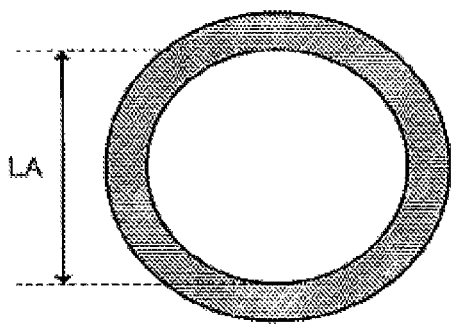

FIGS. 6A and 6B illustrate the shape and size of the contour pattern of an illumination device. A contour pattern of the illumination device is not limited to the rectangular shape as illustrated in 6A, but various shapes may be used. For example, it is obvious that a contour pattern of an illumination device may be circular as illustrated in FIG. 6B. The preferable size LA of the contour pattern of the illumination device may be 10 cm through 13 cm with the size of a palm taken into account.

In the above-mentioned example of the vein image capture device according to the second embodiment, a pyroelectric sensor is provided as a detection device. However, an example of providing a pyroelectric sensor is not limited to the application above. Also in the vein image capture device according to the first embodiment, a pyroelectric sensor is vertical for the wall surface 50, and when the pyroelectric sensor detects that a visitor approaches the device, the illumination device 20 may be turned on.

It is also preferable that, in the vein image capture device according to each of the above-mentioned embodiments, the image capture device is provided with a photodetector device such as an optical sensor etc., the illumination device emits light to the palm, and the image capture device automatically start capturing an image when the photodetector device receives the light reflected by the palm.

It is also preferable in the vein image capture device according to each of the above-mentioned embodiments that the image capture device corrects an image of the captured vein pattern of the palm based on the size of the captured contour pattern of the illumination device. Concretely, the image capture device may calculate the distance between the support device and the image capture device based on the size of the image of the captured contour pattern of the illumination device, and correct the image of the captured vein pattern of the palm. Thus, the image of the vein pattern may be corrected in an appropriate size.

Furthermore, in each of the above-mentioned embodiments, it is assumed that the vein pattern of a palm is used in authentication. However, it is obvious that the living body part used in authentication is not limited to a palm. For example, it is obvious that a device which uses a vein pattern of any other living body part such as the retina of an eye may use the method described above.

The embodiment of the present invention is not limited to the examples according to the embodiments above, but any variations are accepted within the gist of the present invention or the scope of the concept of the present invention described in the claims for the patent and the entire specification thereof.

According to the present embodiment, the support device may be only to support the illumination device. Therefore, as compared with the case in which the support device supports both image capture device and illumination device, the thickness of the support device may be reduced, and various attachment conditions are satisfied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A vein image capture apparatus comprising:
   an illumination unit that illuminates a body part of a living body;
   an image pickup unit that captures a vein pattern of the body part by receiving light reflected by the body part; and
   a support unit disposed between the body part and the image pickup unit, that allows the reflected light to pass and supports the illumination unit at the body part side;
   wherein the image pickup unit is separated from the support unit by a distance at which the image pickup unit receives the reflected light; and
   wherein a distance between the support unit and the image pickup unit is variable along a direction of irradiation of the light; and
   wherein the illumination unit illuminates the body part when the support unit approaches the image pickup unit.

2. The vein image capture apparatus according to claim 1, further comprising a control unit that synchronizes illumination timing by the illumination unit with capture timing by the image pickup unit.

3. The vein image capture apparatus according to claim 1, wherein:
   the illumination unit has a light source including a plurality of wavelengths; and
   the image pickup unit captures the body part depending on the illumination timing of the light source of each wavelength.

4. The vein image capture apparatus according to claim 1, wherein:
   the support unit is a window of a car; and
   brightness of the illumination unit is set so that the brightness becomes lower in a direction toward a ceiling of the car.

5. The vein image capture apparatus according to claim 1, wherein:
   the illumination unit has a contour pattern indicating a capture range; and
   a plurality of light sources are arranged along the contour pattern.

6. The vein image capture apparatus according to claim 5, wherein the image pickup unit calculates a distance between the support unit and the image pickup unit based on a size of an image of the captured contour pattern, and corrects an image of the captured vein pattern of the body part based on the calculated distance.

7. The vein image capture apparatus according to claim 5, wherein the image pickup unit performs tracking by detecting the contour pattern.

8. A vein image capture method performed by a vein image capture apparatus, the method comprising:
  illuminating, by an illumination unit, a body part of a living body; and
  capturing, by an image pickup unit, a vein pattern of the body part by receiving light reflected by the body part, wherein
  the vein image capture apparatus comprises a support unit disposed between the body part and the image pickup unit, that allows the reflected light to pass and supports the illumination unit at the body part side,
  the image pickup unit is separated from the support unit by a distance at which the image pickup unit receives the reflected light,
  a distance between the support unit and the image pickup unit is variable along a direction of irradiation of the light, and
  the illumination unit illuminates the body part when the support unit approaches the image pickup unit.

* * * * *